United States Patent
Kim et al.

(10) Patent No.: US 8,442,820 B2
(45) Date of Patent: May 14, 2013

(54) COMBINED LIP READING AND VOICE RECOGNITION MULTIMODAL INTERFACE SYSTEM

(75) Inventors: Dae Hee Kim, Seoul (KR); Dai-Jin Kim, Gyeongsangbuk-do (KR); Jin Lee, Gyeongsangbuk-do (KR); Jong-Ju Shin, Gyeongsangbuk-do (KR); Jin-Seok Lee, Gyeongsangbuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 593 days.

(21) Appl. No.: 12/628,514

(22) Filed: Dec. 1, 2009

(65) Prior Publication Data

US 2011/0071830 A1    Mar. 24, 2011

(30) Foreign Application Priority Data

Sep. 22, 2009   (KR) ................. 10-2009-0089637

(51) Int. Cl.
*G10L 15/16*    (2006.01)
*G10L 15/24*    (2006.01)

(52) U.S. Cl.
USPC ........... 704/231; 704/232; 704/243; 704/270; 382/118; 382/156

(58) Field of Classification Search ............... 704/232, 704/236, 240, 270, 231, 243; 382/116, 118, 382/156
See application file for complete search history.

(56) References Cited

U.S. PATENT DOCUMENTS

| | | | |
|---|---|---|---|
| 5,537,488 A * | 7/1996 | Menon et al. ................. | 382/170 |
| 5,771,306 A * | 6/1998 | Stork et al. .................... | 382/100 |
| 6,061,652 A * | 5/2000 | Tsuboka et al. .............. | 704/245 |
| 6,219,639 B1 * | 4/2001 | Bakis et al. ................... | 704/246 |
| 6,263,334 B1 * | 7/2001 | Fayyad et al. ................. | 707/737 |
| 6,285,785 B1 * | 9/2001 | Bellegarda et al. ........... | 382/187 |
| 6,366,885 B1 * | 4/2002 | Basu et al. .................... | 704/270 |

(Continued)

FOREIGN PATENT DOCUMENTS

| | | |
|---|---|---|
| JP | 2008-146268 A | 6/2008 |
| JP | 2008-310382 A | 12/2008 |

(Continued)

OTHER PUBLICATIONS

Wang et al., "Face Animation Parameters Extraction and Driving", IEEE International Symposium on Communications and Information Technology, 2004, ISCIT 2004, Oct. 26 to 29, 2004, vol. 2, pp. 1242 to 1245.*

(Continued)

*Primary Examiner* — Martin Lerner
(74) *Attorney, Agent, or Firm* — Edwards Wildman Palmer LLP; Peter F. Corless (57) ABSTRACT

The present invention provides a combined lip reading and voice recognition multimodal interface system, which can issue a navigation operation instruction only by voice and lip movements, thus allowing a driver to look ahead during a navigation operation and reducing vehicle accidents related to navigation operations during driving. The combined lip reading and voice recognition multimodal interface system in accordance with the present invention includes: an audio voice input unit; a voice recognition unit; a voice recognition instruction and estimated probability output unit; a lip video image input unit; a lip reading unit; a lip reading recognition instruction output unit; and a voice recognition and lip reading recognition result combining unit that outputs the voice recognition instruction

3 Claims, 4 Drawing Sheets

U.S. PATENT DOCUMENTS

| | | | |
|---|---|---|---|
| 6,633,844 B1 * | 10/2003 | Verma et al. | 704/251 |
| 6,931,351 B2 * | 8/2005 | Verma et al. | 702/182 |
| 7,130,446 B2 * | 10/2006 | Rui et al. | 382/103 |
| 7,165,029 B2 * | 1/2007 | Nefian | 704/236 |
| 7,269,560 B2 * | 9/2007 | Hershey et al. | 704/270 |
| 7,472,063 B2 * | 12/2008 | Nefian et al. | 704/256.1 |
| 7,587,064 B2 * | 9/2009 | Owechko et al. | 382/103 |
| 7,587,318 B2 * | 9/2009 | Seshadri | 704/231 |
| 7,835,568 B2 * | 11/2010 | Park et al. | 382/154 |
| 2004/0030560 A1 * | 2/2004 | Takami et al. | 704/275 |
| 2005/0063582 A1 * | 3/2005 | Park et al. | 382/154 |
| 2006/0001673 A1 * | 1/2006 | Brand | 345/582 |
| 2006/0182311 A1 * | 8/2006 | Lev | 382/103 |
| 2007/0061335 A1 * | 3/2007 | Ramer et al. | 707/10 |
| 2008/0187175 A1 * | 8/2008 | Kim et al. | 382/103 |
| 2008/0192980 A1 * | 8/2008 | Park et al. | 382/103 |
| 2009/0141950 A1 * | 6/2009 | Ryu | 382/118 |

FOREIGN PATENT DOCUMENTS

| | | |
|---|---|---|
| KR | 1998-0050096 | 9/1998 |
| KR | 2004-0053878 | 6/2004 |
| KR | 10-0680278 | 2/2007 |
| KR | 10/20080075260 | 8/2008 |
| KR | 2009-0040014 | 4/2009 |
| KR | 10/20090097292 | 9/2009 |

OTHER PUBLICATIONS

J. Sung, et al., "Facial Shape Tracking Using 3D Extended Active Appearance Model", Department of Computer Science and Engineering, POSTECH (Jan. 9, 2004).

* cited by examiner

COMBINED LIP READING AND VOICE RECOGNITION MULTIMODAL INTERFACE SYSTEM

CROSS-REFERENCE TO RELATED APPLICATION

This application claims under 35 U.S.C. §119(a) the benefit of Korean Patent Application No. 10-2009-0089637 filed on Sep. 22, 2009, the entire contents of which are incorporated herein by reference.

BACKGROUND OF THE INVENTION

The present invention relates, in general, to a combined lip reading and voice recognition multimodal interface system. More particularly, in preferred embodiments, the present invention relates to a combined lip reading and voice recognition multimodal interface system, which can suitably issue a navigation operation instruction primarily, preferably only, by voice and lip movements, thus preferably allowing a driver to look ahead during a navigation operation and suitably reducing vehicle accidents related to navigation operations during driving.

Presently, with the development of automobile technology and the increasing use of vehicles in daily life, there has been increasing interest and demand for safety. Further, with the development of electronic technology, various types of devices, for example, but not limited to, audio equipment, phones, and navigation systems, are routinely mounted in vehicles.

Conventionally, a navigation system is preferably operated by inputting instructions through a touch screen. Although the use of the touch screen can minimize input errors, a user has to use his or her hands and eyes at the same time, which makes it difficult to operate the navigation system during driving, and also distracts the user's attention, thus increasing the risk of an accident. As an alternative to this, an instruction input method using voice recognition has been used. However, this method is susceptible to audio noise, and therefore a malfunction in recognition may occur in a noisy environment.

Research on voice recognition technology using lip reading based on lip image information is still in the beginning stages of algorithm research. To implement a lip reading system operating in real time, it is necessary to stably detect the user's lips, suitably find the feature points of the lips, and suitably track them quickly. Accordingly, a series of processes, including, but not limited to, face detection, lip detection, lip tracking, feature definition, data normalization, speech segment detection, recognition, etc. preferably work together. However, at present, there has not been any consistent research on all the processes.

Conventionally, a lip fitting algorithm based on an active appearance model (AAM) or an active shape model (ASM) has been proposed. Its performance is susceptible to an initial position, and quick movements of lips in speech cannot be robustly tracked, thereby making it difficult to obtain stable feature values when tracking on a video. Although an automated speech detection algorithm for detecting a speech segment with consistency and cutting it into frames is required in order to recognize the feature values after obtaining a change in the features of the lips on a video as the feature values, there has been no research on this algorithm. Further, while research has been conducted on recognizer algorithms using a hidden Markov model (HMM) or a neural net, these algorithms require a certain amount of learning data for learning and further require a large amount of data in learning to implement an elaborate recognizer. It is known that learning data from more than 2,000 people per word is required to learn an existing audio-based speaker-independent voice recognizer. Accordingly, when it is intended to implement a speaker-independent lip reading recognizer, it is not easy to secure enough learning data required for HMM learning. Moreover, since the HMM learning involves a complex mathematical calculation process, a lot of system resources and time are required, thus making it difficult to perform on-line learning in a low specification system, such as a navigation system.

Currently, the independent recognition rate of the lip reading system is 40 to 60%, which is much lower than that of the voice recognizer. This is because the number (13) of basic units (visemes) of pronunciation recognizable from a lip image is 70% lower than the number (44) of the basic units (phonemes) of pronunciation in audio-based voice recognition, thereby considerably reducing the ability to discriminate between words that appear similar in mouth shape. Accordingly, it is difficult for an actual application service system to implement an instruction recognition system by lip reading alone.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present invention provides, in preferred aspects, a combined lip reading and voice recognition multimodal interface system, which implements a lip reading system that effectively detects lips from a face image through a camera, suitably tracks lip movements, and suitably recognizes a voice instruction based on feature values of the lips, and then suitably combines the lip reading system with an audio-based voice recognition system such that lip reading using a camera image can suitably receive an instruction in an environment where a voice recognizer does not work due to noise.

In certain preferred embodiments, the present invention preferably provides a combined lip reading and voice recognition multimodal interface system, which suitably configures an application service screen of a navigation system as an interactive system based on a suitable scenario and limits instructions to be recognized such that necessary instructions alone can be recognized according to each service screen status, thus improving the recognition rate of individual instructions.

In further preferred embodiments, the present invention provides a combined lip reading and voice recognition multimodal interface system, which suitably applies a recognizer algorithm capable of real-time online learning to allow a recognizer to be suitably adapted to the speech characteristics of a driver when the driver uses the system for a long period of time, thus gradually improving recognition rate.

Preferably, a combined lip reading and voice recognition multimodal interface system in accordance with preferred embodiments of the present invention includes, but may not be limited only to, an audio voice input unit that suitably obtains a sound signal input by an audio input sensor or an input audio signal transmitted from the outside by wired or wireless connection; a voice recognition unit that suitably recognizes voice from the input audio signal and calculates an estimated recognition accuracy; a voice recognition instruction and estimated probability output unit that suitably outputs an instruction corresponding to the voice recognized by the voice recognition unit and an estimated recognition probability value; a lip video image input unit that suitably obtains an input image by an image input sensor or an input image transmitted from the outside by wired or wireless connection; a lip reading unit that suitably recognizes a lip reading instruction of a speaker by processing the input image; a lip reading recognition instruction output unit that suitably outputs the lip reading instruction recognized by the lip reading unit; and a voice recognition and lip reading recognition result combining unit that suitably outputs the voice recognition instruction if the estimated probability is above a threshold value and suitably outputs the lip reading instruction if the estimated probability is below the threshold value.

According to certain preferred embodiments of the present invention, the lip reading unit may preferably include, but may not only be limited only to, a lip detector that suitably detects lip features using the input image from the lip video image input unit; a lip model generator that suitably generates a shape model and an appearance model using an active appearance model (AAM) lip model; a lip tracker that suitably tracks lip feature points obtained as a result of the AAM fitting after lip detection using the shape model generated by the lip model generator and a Lucas-Kanade (LK) algorithm; a speech segment detector that suitably inputs frame data of a predetermined period into a neural net recognizer to determine whether the segment is a speech segment or a silence segment based on a series of lip model parameters obtained as the result of lip tracking on consecutive input images; a system mode determiner that suitably determines whether the system is in a learning mode in which the label of lip feature data is known or in a recognition mode in which the label thereof is not known; a lip reading recognition learning unit that suitably learns a k-nearest neighbor (K-NN) learner using feature data and an input label if the system is in the learning mode; an instruction recognition unit that suitably finds a learning pattern most similar to the feature data through the learned K-NN recognizer and outputs a result instruction as a feature value if the system is in the recognition mode; and a lip feature database that suitably stores patterns for each instruction learned offline or online.

According to further preferred embodiments of the present invention, the combined lip reading and voice recognition multimodal interface system may further include, but may not be limited only to, a lip reading feature detection unit that suitably detects lip reading features from an input image from the speech segment detector; a voice recognition word estimated probability determination unit that, if the estimated probability of the instruction recognized by the voice recognition module is above a threshold value, determines to perform learning using the lip image detected by the lip reading feature detection unit as a learning label of the lip features; a lip feature detection determination unit that suitably determines whether image feature data is properly detected; and a real-time lip reading learning unit that updates the lip feature database by suitably performing k-NN learning on the lip feature values provided from the lip reading feature detection unit by using, as a label, the instruction provided from the voice recognition module based, thus implementing a speaker-adaptive real-time learning system.

Preferably, the combined lip reading and voice recognition multimodal interface system may further include an interactive service unit that suitably recognizes necessary instructions in a limited way according to a service scenario, thus implementing an online learning recognition algorithm capable of real-time learning.

According to certain preferred embodiments of the present invention, the interactive service unit may preferably include a service scenario database that preferably defines in advance a list of instructions that can be suitably input for each screen and provides the list of instructions that can be suitably input for each service screen or at each stage when performing lip reading or voice recognition; a service screen; a screen switching unit that performs screen switching in response to an input instruction according to the functions defined in the service scenario database and provides information of the current service status to the service screen; a recognition target word list setting unit that suitably sets a list of words required for each service status or screen in the event of a status change on the basis of the service scenario database.

In other further embodiments of the present invention, the multimodal interface system performs noise-resistant voice recognition by suitably combining lip reading and voice recognition with reference to the list of recognition target words set by the recognition target word list setting unit; a service execution unit that suitably executes screen switching, voice guidance, information registration, and other registered application services in response to an input instruction; and a recognition result determination unit that suitably determines whether voice recognition or lip reading recognition fails or not to decide whether to execute the services on input audio and video signals so as to limit the number of words to be recognized in an actual service, thus considerably improving recognition rate.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

In a first aspect, the present invention features a combined lip reading and voice recognition multimodal interface system, comprising an audio voice input unit, a voice recognition unit, a voice recognition instruction and estimated probability output unit, a lip video image input unit, a lip reading unit, a lip reading recognition instruction output unit, a voice recognition and lip reading recognition result combining unit that outputs the voice recognition instruction.

In one embodiment, the audio voice input unit obtains a sound signal input by an audio input sensor or an input audio signal transmitted from the outside by wired or wireless connection.

In another embodiment, the voice recognition unit recognizes voice from the input audio signal and calculates an estimated recognition accuracy.

In a further embodiment, the voice recognition instruction and estimated probability output unit outputs an instruction corresponding to the voice recognized by the voice recognition unit and an estimated recognition probability value.

In another further embodiment, the lip video image input unit obtains an input image by an image input sensor or an input image transmitted from the outside by wired or wireless connection.

In another embodiment, the lip reading unit recognizes a lip reading instruction of a speaker by processing the input image.

In a further embodiment, the lip reading recognition instruction output unit outputs the lip reading instruction recognized by the lip reading unit.

In another further embodiment, the voice recognition and lip reading recognition result combining unit outputs the voice recognition instruction if the estimated probability is above a threshold value and outputs the lip reading instruction if the estimated probability is below the threshold value.

Advantages and features of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Hereinafter, exemplary embodiments of the present invention will be described with reference to block diagrams for illustrating a combined lip reading and voice recognition multimodal interface system according to preferred embodiments of the present invention. According to certain preferred embodiments of the invention, it should be understood that each of the blocks can be suitably implemented by computer program instructions. Preferably, these computer program instructions can be suitably provided to a processor of a general purpose computer, special purpose computer, or other programmable data processing apparatus to produce a machine, such that the instructions, which suitably execute via the processor of the computer or other programmable data processing apparatus, create means for implementing the functions specified in the flowchart block or blocks.

According to certain preferred embodiments of the present invention, these computer program instructions may also be stored in a computer usable or computer-readable memory that can suitably direct a computer or other programmable data processing apparatus to function in a particular manner, such that the instructions stored in the computer usable or computer-readable memory produce an article of manufacture, preferably including instruction means that suitably implement the function specified in the flowchart block or blocks.

According to certain preferred embodiments, the computer program instructions may also be suitably loaded onto a computer or other programmable data processing apparatus to cause a series of operational steps to be performed on the computer or other programmable apparatus to produce a computer implemented process such that the instructions that suitably execute on the computer or other programmable apparatus preferably provide steps for implementing the functions specified in the flowchart block or blocks.

Preferably, each block of the flowchart illustrations may represent a module, segment, or portion of code, which suitably comprises one or more executable instructions for implementing the specified logical function(s). According to further exemplary embodiments of the present invention, the functions noted in the blocks may preferably occur out of the order. For example, two blocks shown in succession may preferably be executed substantially concurrently or the blocks may sometimes be executed in the reverse order, depending upon the functionality involved.

In certain preferred embodiments, the term 'module', as used therein, includes, but is not limited to, a software or hardware component, such as a field programmable gate-array (FPGA) or application-specific integrated circuit (ASIC), which performs certain tasks. Preferably, a module may preferably be configured to reside on an addressable storage medium and preferably be configured to execute on one or more processors. Accordingly, in further preferred embodiments, an exemplary module may preferably include, but may not be limited only to, components, such as software components, object-oriented software components, class components and task components, processes, functions, attributes, procedures, subroutines, segments of program code, drivers, firmware, microcode, circuitry, data, databases, data structures, tables, arrays, and variables. Preferably, the functionality provided for in the components and modules may be suitably combined into fewer components and modules or further separated into additional components and modules.

Exemplary embodiments of the present invention will be described in detail with reference to the attached drawings.

In certain preferred embodiments, the present invention proposes a combined lip reading and voice recognition multimodal interface system, which implements a lip reading system that effectively detects lips from a face image through a camera, suitably tracks lip movements, and suitably recognizes a voice instruction based on feature values of the lips, and then suitably combines the lip reading system with an audio-based voice recognition system. Accordingly, because the present invention is not affected by audio noise, the invention suitably allows a lip reading technology using a camera image to provide a service by receiving an instruction in an environment where a voice recognizer does not work due to noise generated when listening to radio indoors or when driving a vehicle with the windows down.

In further preferred embodiments, in a navigation system in accordance with the present invention, the lip reading system using a lip image suitably detects the face of a driver from an input image, suitably detects the position of the lips with respect to a lip candidate area from the detected face regions, and then suitably determines precise positions of lip feature points for tracking with respect to the detected lips by using a lip shape model. Accordingly, there are proposed a series of processes in which image feature points are suitably tracked by an image matching algorithm, a speech section is suitably detected from data of temporal changes in the features, and a recognizer recognizes an instruction based on a series of lip feature values sorted by word.

According to further preferred embodiments of the present invention, in order to make up for the problem that the recognition performance of the lip reading technology is suitably low, the present invention proposes, as one exemplary embodiment, a method that can suitably improve the recognition rate of individual instructions by configuring an application service screen of the navigation system as an interactive system based on a scenario and then suitably limiting instructions, such that necessary instructions alone can be recognized according to the screen state of the service, where a reduction in the number of words to be recognized leads to better recognition, while the accuracy is reduced when all instructions registered in the recognizer are recognized simultaneously.

Further, in certain examples of voice recognition using lip features, the features generally vary from person to person, and therefore a suitably large amount of learning data is required for the recognizer. Accordingly, the present invention proposes an adaptive learning system, which applies a recognizer capable of real-time online learning to allow the recognizer to be suitably adapted to the speech characteristics of a driver if the driver uses the system for a long period of time, thus gradually improving recognition rate. In certain exemplary embodiments, under the condition that learning data acquisition is limited, the speaker-independent recognizer provides low recognition rate. According to certain preferred embodiments, the navigation system encompasses a speaker-adaptive real-time lip reading learning algorithm, which can gradually improve recognition rate as a user uses the system by learning, in real time, lip reading feature data of the current speaker through real-time learning and adding the data to the recognizer, where there are not many users in the actual operation of the service and hence a few regular users who are fixed to drivers frequently using some specific instructions.

According to preferred embodiments of the present invention as described herein, the voice recognition and lip reading technology, is a basic interaction technology between a machine and a human being, for example a basic human computer interaction (HCI) technology, which can be widely used in electronic goods such as, but not limited to, televisions, air conditioners, etc. and robot control as well as vehicles.

Figure 1:
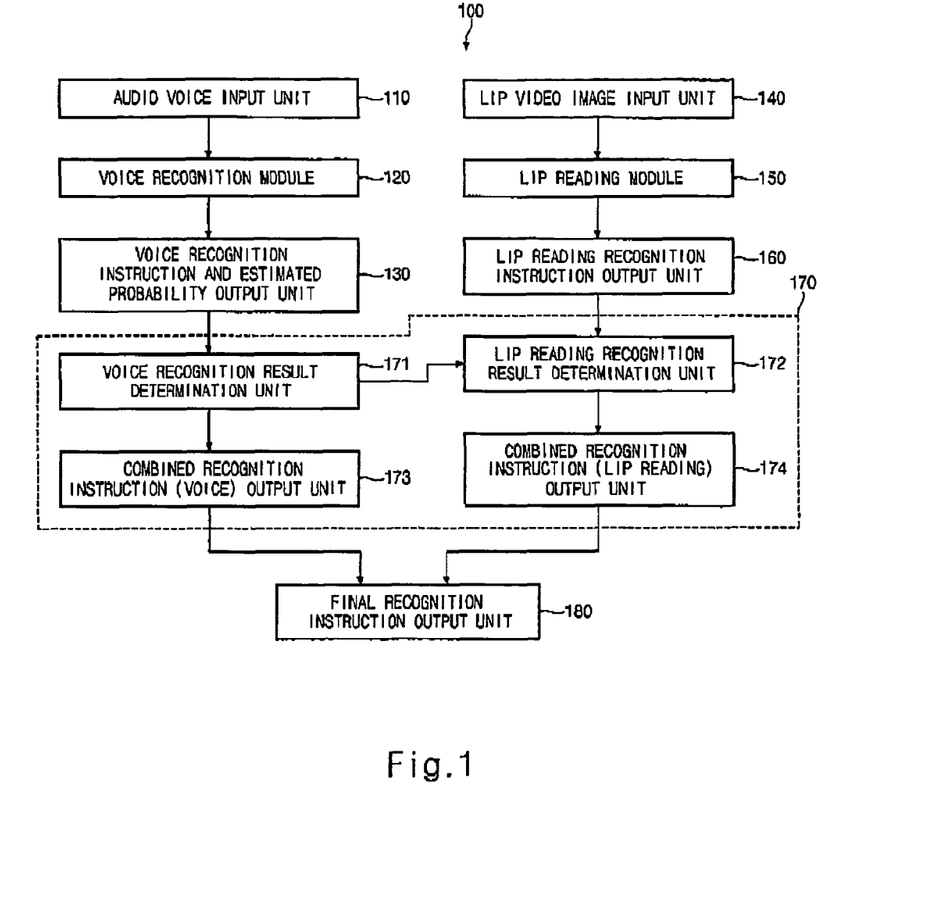
FIG. 1 is a block diagram showing a combined lip reading and voice recognition multimodal interface system in accordance with one exemplary embodiment of the present invention.

According to certain exemplary embodiments, and as shown in FIG. 1, FIG. 1 is a block diagram showing a combined lip reading and voice recognition multimodal interface system.

In certain preferred embodiments, the combined lip reading and voice recognition multimodal interface system 100 comprises an audio voice input unit 110, a voice recognition module 120, a voice recognition instruction and estimated probability output unit 130, a lip video image input unit 140, a lip reading module 150, a lip reading recognition instruction output unit 160, a voice recognition and lip reading recognition result combining unit 170, a final recognition instruction output unit 180. Preferably, the voice recognition and lip reading recognition result combining unit 170 comprises a voice recognition result determination unit 171, a lip reading voice recognition result determination unit 172, a combined recognition instruction (voice) output unit 173, and a combined recognition instruction (lip reading) output unit 174.

Preferably, the audio voice input unit 110 can suitably obtain a sound signal input by an audio input sensor or an input audio signal transmitted from the outside by wired or wireless connection. For example, in certain preferred embodiments, for example in the case of obtaining an input audio signal by the audio input sensor, an input sound signal can be suitably obtained by converting an acoustic signal input through a given microphone into an electric signal. Accordingly, a predetermined input sound signal can be suitably obtained by an analog/digital converter for converting the obtained electric signal into a digital signal and a digital signal processor (DSP) for processing a voice signal obtained by the analog/digital converter. In further preferred embodiments, an input sound may be suitably stored in a storage medium or transmitted in a wired or wireless manner to thereby obtain a predetermined input sound signal.

In further preferred embodiments, the voice recognition module 120 is a commercially available voice recognition module which is capable of suitably setting recognition words for isolated word recognition, has a speaker-independent recognition function, and is able to output a recognition result with estimated recognition accuracy in percentage (%) with regard to registered recognition words and a corresponding word.

Preferably, the voice recognition instruction and estimated probability output unit 130 outputs a probability value that an isolated instruction and a corresponding input voice signal recognized by a voice recognizer are recognized words.

in further preferred embodiments, the lip video image input unit 140 can suitably obtain an input image by an image input sensor or an input image transmitted from the outside by wired or wireless connection. For example, in certain preferred embodiments, in the case of obtaining an input image by the image input sensor, an input image can be suitably obtained by converting an image signal of an object incident through a given lens into an electric signal. For example, in certain preferred embodiments, the image input sensor may include a charge coupled device (CCD), a CMOS, and other commercially available image acquisition means. Further, a predetermined input image can be suitably obtained by an analog/digital converter for converting the electric signal obtained by the image input sensor into a digital signal and a digital signal processor (DSP) for processing the digital signal converted by the analog/digital converter into an image signal. In further preferred embodiments, an input image may be suitably stored in a storage medium or transmitted in a wired or wireless form to thereby obtain a predetermined input image. Preferably, the lip video image input unit 140 can suitably convert the obtained input image into a single-channel image. For example, in certain exemplary embodiments, the input image can be changed to a gray scale. Alternatively, in other exemplary embodiments, if the input image is a multichannel image of 'RGB' channels, the input image can be suitably changed to a single channel value. Accordingly, the brightness distribution of the input image can be easily represented by converting the input image into an intensity value in a single channel.

Preferably, the lip reading module 150 recognizes a voice instruction from a speaker by processing input image data.

Preferably, the lip reading recognition instruction output unit 160 outputs the instruction recognized by the lip reading module 150.

According to further preferred embodiments of the present invention, the voice recognition and lip reading recognition result combining unit 170 suitably combines an audio-based voice recognition result and an image-based lip reading result in such a manner so as to suitably perform the combination on the respective modality feature data or combine the results recognized by the respective systems. Preferably, in certain preferred embodiments, it is an object of the present invention to combine the results with the lip reading by freely using an existing independent voice recognizer. Preferably, the voice recognition result determination units 171 and 172 receive a result of the voice recognition instruction and estimated probability output unit 130 of the independent audio voice input unit 110, determine whether the probability of reliability of word recognition is above or below a suitable specific threshold value, and output the determination result. Preferably, the threshold value can be adjusted and tuned according to systems, and it can be confirmed that a test result that typically shows the highest combined recognition rate with respect to a reliability of 50%. Preferably, when it is determined that the probability of reliability is higher than the threshold value from the results of the voice recognition result determination units 171 and 172, the combined recognition instruction output units 173 and 174 output a recognition result instruction of the voice recognizer to the final recognition instruction output unit 180, and otherwise, output a lip reading recognition result instruction as a recognition result.

As described herein, such a method of combining the voice recognition and lip reading results can be extended as described herein in the following example. In a certain exemplary embodiment, if the reliability of voice recognition of the voice recognition result determination units 171 and 172 is suitably below the threshold value and the lip reading module has not detected any instruction, no output is suitably produced so as to prevent the voice recognizer from malfunctioning due to noise. As described herein, when only one of the recognition modules has suitably detected a specific word and the other recognizers have not detected any word, it is possible to suitably modify the combined algorithm by defining the respective operations.

Figure 2:
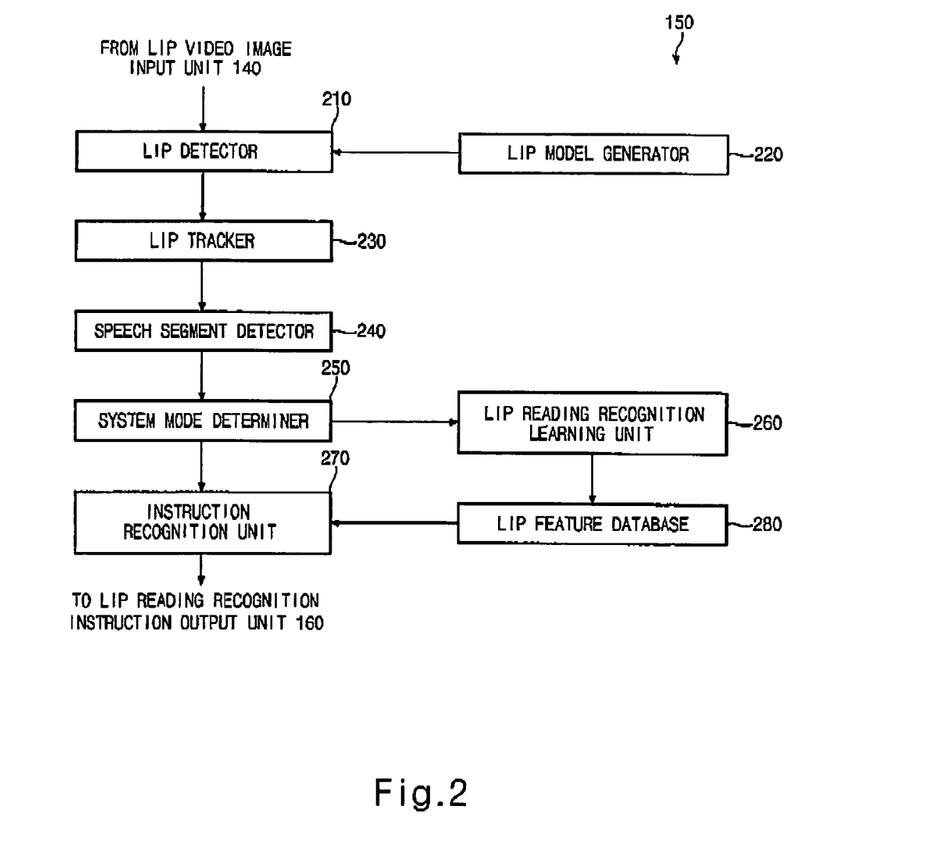
FIG. 2 is a detailed block diagram showing a lip reading module of FIG. 1.

According to certain exemplary embodiment, and as shown in FIG. 2, FIG. 2 is a block diagram showing in detail the lip reading module 150 of FIG. 1.

Preferably, the lip reading module 150 comprises a lip detector 210, a lip model generator 220 for detection and tracking, a lip tracker 230, a speech segment detector 240, a system mode determiner 250, a lip reading recognition learning unit 260, an instruction recognition unit 270, and a lip feature database 280.

According to certain exemplary embodiments, if an input image from the lip video image input unit 140 is a color image, the lip detector 210 suitably converts the input image into a black/white image. There has been a research on a lip detection algorithm using a color image, however, it has been found that the algorithm can be affected by lighting and may not function properly in an infrared image in the nighttime. Accordingly, in the aforementioned exemplary embodiment, description will be given with respect to a case in which lips are detected and tracked by using a black/white image only. Accordingly, it is possible to detect and track lips in a robust way in the daytime and nighttime. According to certain exemplary embodiments, in a lip detection step, the face is firstly detected based on a local binary pattern (LBP) by an adaptive boosting (Adapboost) algorithm, and the lips are suitably detected in the same way with respect to an approximate position of the lips on the face. Accordingly, in further related embodiments, a detector is suitably allowed to learn using normalized face and lip images. Preferably, the Adaboost method cannot determine precise positions of lip feature points for lip reading. Accordingly, the present invention aims at making shape and appearance models using an active appearance model (AAM) lip model to suitably obtain the precise feature points of the lips using this model.

According to further preferred embodiments, the lip model generator 220 suitably points the feature points obtained manually by hand with respect to a lip image on a learning image, collects such data to suitably generate a shape model and an appearance model through principle component analysis (PCA), and uses these models in AAM fitting and lip feature tracking.

Preferably, the lip tracker 230 tracks the lip feature points obtained as a result of AAM fitting after lip detection by using the shape model generated by the lip model generator 220 and a Lucas-Kanade (LK) algorithm. Preferably, the lip tracking result for each input image is suitably provided to the lip reading module 150 using a shape parameter as a feature value.

In another further embodiment, the speech segment detector 240 suitably inputs frame data of a predetermined period into a neural net recognizer to determine whether the segment is a speech segment or a silence segment based on a series of lip model parameters that are suitably obtained as the result of lip tracking on consecutive input images. Accordingly, as a result of determination, if the speech segment continues and then changes to a silence segment, the feature data of the speech segment is suitably extracted and output.

According to certain preferred embodiments, the system mode determiner 250 suitably determines whether the system is in a learning mode in which the label of lip feature data is known or in a recognition mode in which the label thereof is not known. Preferably, in the learning mode, the lip reading recognition learning unit 260 is allow to learn a k-nearest neighbor (K-NN) learner using feature data and an input label. Preferably, unlike HMM, an efficient learning is possible with a small amount of learning data, and the recognizer can be gradually updated through real-time learning because of its simple structure. Preferably, in the recognition mode in which an input feature value has no label, the instruction recognition unit 270 finds a suitable learning pattern most similar to the feature data by the K-NN recognizer learned in the lip reading recognition learning unit 260, and suitably outputs a result instruction as the feature value to the lip reading recognition instruction output unit 160.

Preferably, the lip feature database 280 stores patterns for each instruction learned offline or online.

The operation of the lip reading module 150 according to preferred exemplary embodiments will be described in more detail below.

According to certain preferred embodiments of the present invention, the lip detector 210 provides an approximate position of the lips with respect to a mono image in a robust way in the daytime and nighttime by using LBP image conversion and Adaboost algorithm, suitably locates the overall position of the lips using an overall lip model, suitably detects the corners of the lips using a lip corner model, suitably performs precise fitting by setting the corner positions of the lips as the initial positions using the AAM lip model, and suitably provides the coordinates of the feature points as the initial position values of the lip tracker 230.

In certain exemplary embodiments, the lip tracker 230 tracks m×m pixel regions around a feature point on a subsequent input image by setting the respective AAM lip detection results as the initial feature points using an LK-based image registration algorithm and the lip shape model. Further, although the number of pixels can preferably be adjusted, the most similar region is suitably detected from the next frame and matched with respect to 11×11 pixel regions per feature point, and the matching result is suitably input to the shape model so as to obtain a shape model parameter and provide the same to the speech segment detector 240.

Preferably, the speech segment detector 240 suitably receives the shape model parameter of the lips as a series of temporal streams, suitably determines through the neural net recognizer whether a predetermined segment of each frame is a speech or not, suitably extracts feature data of the speech segment when the speech segment changes to a non-speech segment after continuing for a predetermined time, and suitably provides the data to the lip reading recognition learning unit 260.

According to further preferred embodiments of the present invention, the lip reading recognition learning unit 260 suitably learns the K-NN lip reading recognizer offline using prepared lip feature data grouped by word and label information and preferably provides an initial recognizer as a result to the lip reading module 150.

Preferably, the instruction recognition unit 270 suitably identifies a word through a k-NN recognition algorithm with respect to new input data based on the result of the lip reading recognition learning unit 260, and suitably returns a result instruction to the lip reading module 150.

Figure 3:
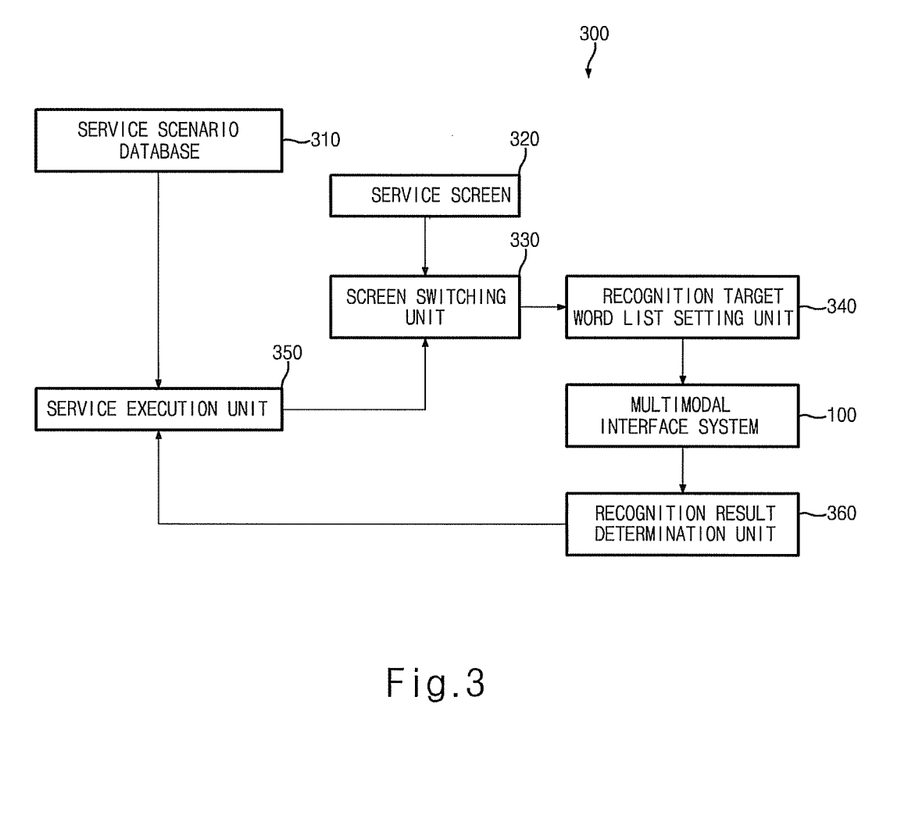
FIG. 3 is a detailed block diagram implementing a combined lip reading and voice recognition multimodal interface system in accordance with preferred embodiments of the present invention implemented as an interactive service system.

According to certain preferred embodiments of the invention, and as shown in FIG. 3, FIG. 3 is a detailed block diagram suitably implementing a combined lip reading and voice recognition multimodal interface system.

Preferably, an interactive service system 300 comprises a service scenario database 310, a service screen 320, a screen switching unit 330, a recognition target word list setting unit 340, a service execution unit 350, a multimodal interface system 100, and a recognition result determination unit 360.

In further preferred embodiments, the interactive service system 300 suitably limits the number of words to be recognized in an actual service through an interactive system or scenario base system in order to make up for the fundamental problem of a reduction in recognition rate of the lip reading system 200, thereby achieving a substantial improvement in the recognition rate.

According to certain exemplary embodiments of the present invention, the service scenario database 310 can preferably be assumed to be equipped with a navigation service. Preferably, screens of the service can be suitably designed as necessary service screens such as a start screen, a main menu screen, a locating screen, a routing screen, an actual road guide screen, etc. Preferably, the service scenario database 310 defines in advance a list of instructions that can be input for each screen and suitably provides the list of instructions that can be input for each service screen or at each stage when performing lip reading or voice recognition.

Preferably, the service screen 320 represents each service screen, such as, but not limited to, an initial screen, a main menu screen, etc.

Preferably, the screen switching unit 330 performs screen switching in response to an input instruction according to the functions defined in the service scenario database 310 and provides information of the current service status to the service screen 320.

In further preferred embodiments, the recognition target word list setting unit 340 sets a list of words suitably required for each service status or screen in the event of a status change on the basis of the service scenario database 310.

Preferably, the service execution unit 350 suitably executes screen switching, voice guidance, information registration, and other registered application services in response to an input instruction.

In further preferred embodiments, the multimodal interface system 100 suitably performs noise-resistant voice recognition by combining lip reading and voice recognition with reference to the list of recognition target words set by the recognition target word list setting unit 340.

Preferably, the recognition result determination unit 360 suitably determines whether voice recognition or lip reading recognition fails or not to decide whether to execute the services on the input audio and video signals. According to certain preferred embodiments, this is determined by using its own estimated reliability of instruction recognition. In further preferred embodiments, if recognition succeeds, the service execution unit 350 suitably executes the service corresponding to the instruction, and otherwise, waits for an instruction input in a service standby mode.

Figure 4:
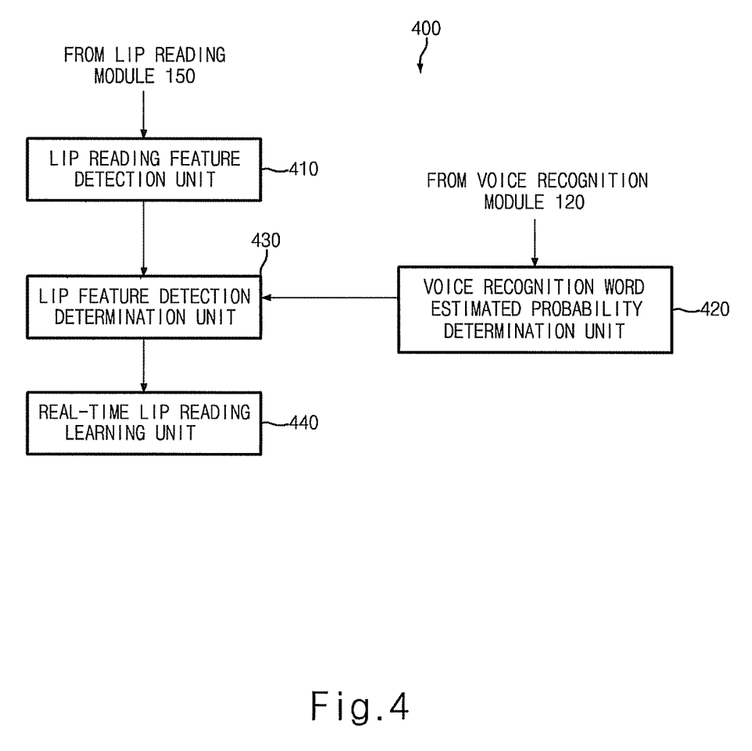
FIG. 4 is a detailed block diagram showing a speaker-adaptive real-time lip reading learning system.

According to certain preferred embodiments and as shown in FIG. 4, FIG. 4 is a detailed block diagram showing a speaker-adaptive real-time lip reading learning system.

In certain preferred embodiments, a speaker-adaptive real-time lip reading learning system 400 suitably comprises a lip reading feature detection unit 410, a voice recognition word estimated probability determination unit 420, a lip feature detection determination unit 430, and a real-time lip reading learning unit 440. In certain preferred embodiments, the reason that the real-time learning is required is that, although the lip reading suitably requires a large amount of learning data to learn a speaker-independent recognizer with a large deviation in personal feature data, it is not easy to collect learning data and hence the real-time lip reading learning unit 440 needs to learn the k-NN recognizer so as to be adapted to an individual service user in an actual situation.

In certain preferred embodiments of the present invention, the lip reading feature detector unit 410 suitably detects lip reading features from an input image from the speech segment detector 240 of the lip reading module 150.

According to certain preferred embodiments of the present invention, the voice recognition word estimated probability determination unit 420 suitably evaluates the reliability of an instruction recognized by the voice recognition module 120 to determine whether the instruction can be used as the learning label of the lip image features detected by the lip reading feature detection unit 410. Preferably, if an estimated value of the reliability of the instruction recognized by the voice recognition module 120 is above a specific threshold value, learning is performed, and otherwise, learning is not performed.

Preferably, the lip feature detection determination unit 430 suitably determines whether image feature data is properly detected in preparation for the case that no image feature data would be detected even if the voice recognition module 120 has suitably recognized the instruction.

Preferably, in certain embodiments, the real-time lip reading learning unit 440 updates the lip feature database 280 of FIG. 2 by suitably performing k-NN learning on the lip feature values provided from the lip reading feature detection unit 410 in an actual service system in the same way as offline by using, as a label, the instruction provided from the voice recognition module 120. Preferably, such a series of learning continues for each input during the service to learn the lip reading module 150 based on high recognition performance of the voice recognition module 120 in a noise-free environment, thereby enabling the lip reading module 150 to suitably recognize the instruction and continuing the service even if the voice recognition module 120 is unable to function any more in a noise environment. The present invention preferably provides a solution to the problem of the reduction in recognition rate that is observed in the existing voice recognition method. Accordingly, the present invention preferably allows a user to suitably manipulate basic instructions of the navigation in place of the audio-based voice recognizer in an environment where noise is always present, such as the inside of a running vehicle. The present invention further provides a method and system that does not distract the user's attention by operating the navigation system via a touch screen during driving, and thus prevents the risk of an accident. Further, the present invention provides a method of using a voice recognizer to manipulate devices such as audio equipment, that always produces noise.

Preferably, the present invention is not limited to specific services but applicable to almost all services, such as, but not limited to, vehicles, robots, home electronics, etc. to which a voice recognizer is currently applied. Accordingly, this overcomes the difficulties in suitably applying the existing voice recognizer which may not function properly in an actual environment exposed to daily noise.

According to preferred embodiments of the present invention, the combined lip reading and voice recognition multimodal interface system implements a lip reading system which suitably detects lips from a face image through a camera, tracks lip movements, and suitably recognizes a voice instruction based on feature values of the lips, and then suitably combines the lip reading system with an audio-based voice recognition system, thus providing a multimodal voice recognition system. Preferably, since the combined lip reading and voice recognition multimodal interface system is not suitably affected by audio noise, the combined lip reading and voice recognition multimodal interface system preferably allows a lip reading technology using a camera image to provide a service by receiving an instruction in an environment where a voice recognizer does not work due to noise generated when listening to radio indoors or when driving a vehicle with the windows down.

In another preferred embodiment, the combined lip reading and voice recognition multimodal interface system can suitably configure an application service screen of a navigation system as an interactive system based on a scenario and suitably limit instructions to be recognized such that necessary instructions alone can be suitably recognized according to each service screen status, thus improving the recognition rate of individual instructions.

In further preferred embodiments of the present invention, the combined lip reading and voice recognition multimodal interface system applies a recognizer algorithm capable of real-time online learning to allow the recognizer to be suitably adapted to the speech characteristics of a driver if the driver uses the system for a long period of time, thus gradually improving recognition rate.

The above embodiments of the present invention are illustrative and not limitative. Various alternatives and equivalents are possible. The invention is not limited by the embodiment described herein. Nor is the invention limited to any specific type of semiconductor device. Other additions, subtractions, or modifications are obvious in view of the present disclosure and are intended to fall within the scope of the appended claims.

What is claimed is:

1. A combined lip reading and voice recognition multimodal interface system, comprising:
   a voice recognition module, executed by an audio signal processor, recognizing an instruction through performing voice recognition; and
   a lip reading module, executed by a video signal processor, performing lip reading recognition and providing an image,
   wherein the lip reading module comprising:
   a lip detector that detects lip features using the input image from a lip video image input unit;
   a lip model generator that generates a shape model and an appearance model using an active appearance model (AAM) lip model;
   a lip tracker that tracks lip feature points obtained as a result of the AAM fitting after lip detection using the shape model generated by the lip model generator and a Lucas-Kanade (LK) algorithm;
   a speech segment detector that inputs frame data of a predetermined period into a neural net recognizer to determine whether the segment is a speech segment or a silence segment based on a series of lip model parameters obtained as the result of lip tracking on consecutive input images;
   a system mode determiner that determines whether the system is in a learning mode in which the label of lip feature data is known or in a recognition mode in which the label thereof is not known;
   a lip reading recognition learning unit that learns a k-nearest neighbor (K-NN) learner using feature data and an input label if the system is in the learning mode;
   an instruction recognition unit that finds a learning pattern most similar to the feature data through the learned K-NN recognizer and outputs a result instruction as a feature value if the system is in the recognition mode; and
   a lip feature database that stores patterns for each instruction that are learned offline or online.

2. The system of claim 1 further comprising:
   a lip reading feature detection unit that detects lip reading features from an input image from the speech segment detector;
   a voice recognition word estimated probability determination unit that, if the estimated probability of the instruction recognized by the voice recognition module is above a threshold value, determines to perform learning using the lip image detected by the lip reading feature detection unit as a learning label of the lip features;
   a lip feature detection determination unit that determines whether image feature data is properly detected; and
   a real-time lip reading learning unit that updates the lip feature database by performing k-NN learning on the lip feature values provided from the lip reading feature detection unit by using, as a label, the instruction provided from the voice recognition module, thus implementing a speaker-adaptive real-time learning system.

3. The combined lip reading and voice recognition multimodal interface system of claim 1, further comprising:
   a service scenario database that defines in advance a list of instructions that are configured to be input for each screen and provides the list of instructions that are configured to be input for each service screen or at each stage when performing lip reading or voice recognition; and a service screen, wherein:
- a recognition target word list setting unit sets a list of words required for each service status or screen in an event of a status change on the basis of the service scenario database,
- the multimodal interface system performs lip reading and voice recognition with reference to the list of recognition target words set by the recognition target word list setting unit and is able to output an instruction for voice recognition and an instruction for lip reading,
- a recognition result determination unit determines whether voice recognition or lip reading recognition succeeds or not, performed by the multimodal interface,
- a service execution unit executes screen switching, voice guidance, information registration, and the instruction for voice recognition or the instruction for lip reading, in response to an input instruction, when the voice recognition or lip reading recognition succeeds, as a result of determination from the recognition result determination unit, and
- a screen switching unit performs screen switching in response to the instruction for voice recognition and the instruction for lip reading according to the list of instructions defined in the service scenario database and provides information of the current service status to the service screen.

* * * * *